United States Patent [19]
Schneider et al.

[11] Patent Number: 6,162,290
[45] Date of Patent: Dec. 19, 2000

[54] RELEASE AGENT

[75] Inventors: Angela Schneider; Valentina Schneider, both of Bremen; Horst Wochnowski, Norderstedt; Peter Niemeyer, Delmenhorst, all of Germany

[73] Assignee: Acmos Chemie GmbH & Co., Bremen, Germany

[21] Appl. No.: 09/111,855

[22] Filed: Jul. 8, 1998

[30] Foreign Application Priority Data

May 28, 1998 [DE] Germany ............................ 198 23 883
May 29, 1998 [DE] Germany ............................ 198 24 279

[51] Int. Cl.$^7$ ........................ C08L 91/00; C09D 191/00; C09D 191/06
[52] U.S. Cl. ..................... 106/38.22; 106/38.25; 106/271; 106/285; 106/287.1
[58] Field of Search ............................ 106/38.22, 38.24, 106/38.25, 271, 285, 287.1; 264/338

[56] References Cited

U.S. PATENT DOCUMENTS

| | | | |
|---|---|---|---|
| 3,354,180 | 11/1967 | Ekiss et al. ............................ | 106/271 |
| 3,847,622 | 11/1974 | Brandl et al. ......................... | 106/271 |
| 3,931,381 | 1/1976 | Lindberg ............................... | 106/271 |
| 4,028,120 | 6/1977 | Emond ................................... | 106/271 |
| 4,308,063 | 12/1981 | Horiuchi et al. .................... | 106/38.22 |
| 4,609,511 | 9/1986 | Fischer et al. ...................... | 106/38.25 |
| 4,614,633 | 9/1986 | Steinbach et al. ................... | 264/338 |
| 4,761,443 | 8/1988 | Lopes .................................... | 264/338 |
| 4,969,952 | 11/1990 | Hattich et al. ....................... | 106/271 |
| 5,100,697 | 3/1992 | Nielsen ................................. | 427/133 |
| 5,294,251 | 3/1994 | Urena .................................... | 106/271 |
| 5,308,393 | 5/1994 | Hattich et al. ....................... | 106/271 |
| 5,626,656 | 5/1997 | Kondo et al. ....................... | 106/38.22 |
| 5,639,820 | 6/1997 | Kubo et al. .......................... | 524/758 |

*Primary Examiner*—Allan R. Kuhns
*Attorney, Agent, or Firm*—Schiff Hardin & Waite

[57] ABSTRACT

A release agent method of use and method for production thereof is disclosed and described. The release agent contains release-active substances such as one or more oils, waxes, silicones and/or soaps, and optionally emulsifiers and other conventional additives in a carrier. The latter carrier is a mixture of at least one hydrocarbon and water. Said mixture being in the form of a water-in-oil dispersion.

9 Claims, No Drawings

RELEASE AGENT

FIELD OF THE INVENTION

The present invention relates to a release agent containing as release-active substances oils, waxes, silicones and/or soaps. More specifically, the present invention relates to release agents with said release-active substances and, optionally, emulsifiers and other conventional additives, in a suitable carrier. Further, the present invention relates to the use and process for the production of said release agents.

BACKGROUND OF THE INVENTION

The production of polyurethane foam molded parts requires the treatment of the mold, which is normally made of metal, wood or resin, with a release agent where the mold surface gets into contact with the foam-forming compounds in order to allow an easy and clean demolding of the parts after polymerization. The mold surface is therefore coated with a uniform layer of the release agent, forming a releasing film, by applying various spraying techniques known to those skilled in the art.

The presently used release agents for the demolding of the molded parts usually contain release-active substances, such as e.g. oils, waxes, silicones and/or soaps dispersed in a carrier. As a carrier, either one or more organic solvents or water can be used. They will not only act as a carrier for the release-active substances and as solvent for further additives, but also, the carrier allows adjustment to an optimum concentration of active ingredients, wetting and spreading and the formation of the release film on the mold surface, and the carriers favorably influence the surface of the polyurethane molded parts. Further, prerequisites for the carrier include cost-efficiency, processing safety, and compatibility with the environment.

The greatly increased interest in the protection of the environment and the associated stricter government regulations have led to the aim of reducing to the absolute minimum the use of volatile organic solvents. Therefore, over the past few years, increased interest has been attached to the use of water as a carrier and diluent for release agents, due to its unobjectionability with regards to health and the protection of the environment.

However, water as the carrier in release agents for polyurethane molded foam parts suffers from a number of disadvantages requiring specific adaptations (c.f. H. Wochnowski, Kunststoffe, 79, 1989, 8, pp 680–683). In connection with efforts made to develop aqueous release agents reference is made to EP-A-164 501, EP-A-188 219 and EP-A-272 629.

The disadvantages of purely aqueous release agent systems compared with release agents based on organic solvents relate to mold environment contamination, the impossibility of cleaning the mold by melting the residue and resulting increased cleaning costs and (in many cases undesired) closed and frequently fatty surfaces of the polyurethane molded parts.

SUMMARY OF THE INVENTION

Therefore, an advantage of the present invention is to propose a novel release agent, which overcomes the described disadvantages of known, purely aqueous release agents and which is simultaneously much more environmentally friendly than the known release agent systems based on organic solvents.

According to the invention, a release agent according to the present invention includes the carrier comprising a mixture of at least one hydrocarbon and water, said mixture being in the form of a water-in-oil dispersion.

In addition, the hydrocarbon or hydrocarbon mixture have a boiling point between 60° C. and 240° C.

The water fraction can be in a range of about 10 to 70 wt. %. Preferably, the water fraction is a maximum of about 60 wt. %.

In addition, the invention relates to the use of the inventive release agent for the production of polyurethane (PUR) molded parts.

A further aspect of the invention is a process for the production of the inventive release agent, in which initially separately a first mixture of water and optionally at least part of the surfactant and a second and optionally third mixture, which contain the hydrocarbon or hydrocarbons, the release-active substances and the other additives are prepared and subsequently the second and optionally third mixture are slowly dispersed in the first mixture.

The second mixture largely contains the hydrocarbon or hydrocarbons.

An essential feature of the newly evolved hydrocarbon/water mixtures, whose action has been confirmed as positive by corresponding series of tests, as a carrier medium for release-active substances is that the release agent system is in the form of a water-in-oil (W/O) dispersion, i.e. the water is enclosed by the hydrocarbon or hydrocarbons. The term "dispersion" is to be understood in its broadest sense as a system formed by several phases, whereof one is continuous (dispersant) and at least one further phase is finely dispersed therein (dispersed phase). In the present context, this is in particular intended to cover suspensions, emulsions and microemulsions.

The hydrocarbon used for the present invention is in particular a substance with a boiling point between 60° C. and 240° C., i.e. a hydrocarbon with approximately 5 to approximately 14 carbon atoms. It is obviously also possible to use the most varied mixtures of hydrocarbons, such as in particular commercially available white spirit or isoparaffin mixture with a specific boiling point range.

A characteristic feature of the inventive release agent is its ability to be diluted with the hydrocarbon used as a solvent. As a result of the character of the water-in-oil system there is also a low electrical conductivity.

Emulsifiers, if necessary, are used for preparation the water-in-oil dispersion according to the invention. It is possible for this purpose to use the anionic, cationic or nonionic surfactants conventionally used as emulsifiers in the prior art.

Whereas conventional aqueous release agent systems constitute oil-in-water (O/W) dispersions, i.e., are dilutable in water and consequently have the aforementioned, known disadvantages, the inventively proposed, emission-reduced hydrocarbon/water release agent systems are more environmentally friendly, due to their high water proportion, than known, solvent-based systems (ecological advantage due to a reduction of volatile organic solvents), but also lead to mold removal qualities, which are far superior to the hitherto known, aqueous release agents and which are comparable to those of known, solvent-based release agents (reduced need for cleaning molds, longer cleaning cycles, positive influencing of the PUR surface).

In an embodiment, the present invention provides a release agent that comprises a release-active substance that comprises a material selected from the group consisting of at least one oil, at least one wax, at least one silicone, at least one soap and mixtures thereof. The release agent of the present invention further comprises a carrier which, in turn, comprises a dispersion of at least one hydrocarbon and water.

In an embodiment, the release agent further comprises an emulsifier.

In an embodiment, the release agent further comprises a surfactant.

In an embodiment, the dispersion of said release agent is further characterized as being a water-in-oil dispersion.

In an embodiment, the at least one hydrocarbon has a boiling point ranging from about 60° C. to about 240° C.

In an embodiment, the water is present in the release agent of the present invention in a weight percent ranging from about 10% to about 70%.

In an embodiment, the water is present in a weight percent of not more than 60%.

The present invention also provides a method of molding a part from polyurethane foam which comprises the steps of providing a mold, coating the mold with a release agent as described above, filling the mold with polyurethane foam, allowing the polyurethane foam to harden and removing the hardened polyurethane foam from the mold.

In an embodiment, the present invention provides a method of manufacturing a release agent comprising the steps of vigorously mixing water and a surfactant to form a homogenous first mixture, mixing at least one hydrocarbon and a release-active substance selected from the group consisting of at least one oil, at least one wax, at least one soap and mixtures thereof to form a second mixture, and mixing the first mixture and second mixture together to form a dispersion.

In an embodiment, the method of manufacturing a release agent further comprises the step of adding silicone to the dispersion and vigorously mixing the silicone and dispersion together to form a homogenous third mixture.

Other objects and advantages of the invention will become apparent upon reading the following detailed description and appended claims.

DETAILED DESCRIPTION OF THE PRESENTLY PREFERRED EMBODIMENTS

The following Examples 1 to 3 reveal release agent formulations, which are designed for different use ranges. Example 4 relates to a typical production process for a release agent according to the invention.

EXAMPLE 1

The release agent of the following composition is particularly suitable for use in semi-rigid integral skin polyurethane field. A mixture of wax and silicone is used as the release-active substance. The hydrocarbon mixture used is a commercially available white spirit with a boiling range between about 145° C. and about 160° C. The added catalyst, e.g. a tin catalyst, is used for improving the surface quality of the polyurethane molded foam part produced:
4.6000% wax
10.2000% silicone
0.7000% catalyst
0.1875% surfactant
1.3275% matting agent, solubilizer
60.3850% white spirit
22.6000% water.

EXAMPLE 2

The subsequently formulated release agent is specifically intended for use in the production of shoe soles made of PUR foam. A mixture of silicone and paraffinic mineral oil is used as the release-active substance. The inventively used hydrocarbon is an isoparaffin mixture with a boiling point range between about 187° C. and about 212° C.:
12.0000% silicone
28.0000% paraffinic mineral oil
0.5000% surfactant
24.5000% isoparaffin mixture
35.0000% water

EXAMPLE 3

The following release agent is intended for use in the PUR cold flexible foam field. Waxes are used as the release-active substances. The inventively used hydrocarbon is an isoparaffin mixture with a boiling point range between about 187° C. and about 212° C.:
6.5280% waxes
2.2600% surfactants, emulsifiers
1.8796% lubricants, other additives
64.6324% isoparaffin mixture
24.7000% water.

EXAMPLE 4

For the preparation of a release agent according to Example 1, a first mixture of water and optionally the surfactant is prepared in a first container. In a second container is prepared a second mixture, where the wax, catalyst and other additives are mixed into the white spirit. The liquid silicone is placed in a third container.

Firstly the content of the first container, i.e. the first mixture of water and surfactant, is homogenized by vigorous stirring. Subsequently the content of the second container is slowly dispersed in the first mixture in the first container with homogenizing. The silicone from the third container is then added and the mixture is again homogenized.

Thus, effectively, the desired water-in-oil dispersion can be prepared and simultaneously the risks related, evoked with the low conductivity due to electrostatic charging are effectively avoided. The thus produced release agent is suitable for use with known spraying processes without any restrictions being applied and leads to the aforementioned, excellent mold removal characteristics.

The features of the invention disclosed in the preceding description and in the claims can be essential to the implementation of the different embodiments of the invention, either singly or in random combinations.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. A release agent comprising:
    a release-active substance selected from the group consisting of at least one oil in combination with at least one silicone, at least one wax, at least one silicone in combination with at least one wax, at least one soap and mixtures thereof,
    a carrier comprising a dispersion of at least one hydrocarbon and water, the hydrocarbon having a boiling point ranging from about 147° C. to about 212° C., the water content is less than 40 weight percent of the release agent. wax and the water content is less than 30 weight percent.

2. The release agent of claim 1 further comprising an emulsifier.

3. The release agent of claim 1 further comprising a surfactant.

4. The release agent of claim 1 wherein the dispersion is further characterized as being a water-in-oil dispersion.

5. The release agent of claim 1 wherein the release-active substance content ranges from about 6 weight percent to about 38 weight percent of the release agent.

6. The release agent of claim 1 wherein the hydrocarbon content ranges from about 24 weight percent to about 65 weight percent of the release agent.

7. The release agent of claim 1 wherein the release-active substance is a mixture of wax and silicone and the water content is less than 25 weight percent.

8. The release agent of claim 1 wherein the release-active substance is a mixture of silicone and mineral oil and the water content is less than 40 weight percent.

9. The release agent of claim 1 wherein the release-active substance is at least one wax and the water content is less than 30 weight percent.

* * * * *